US011922405B2

(12) United States Patent
Hilton et al.

(10) Patent No.: US 11,922,405 B2
(45) Date of Patent: Mar. 5, 2024

(54) SYSTEM AND METHOD FOR PERFORMING TRANSACTIONS WITH EXCHANGEABLE CRYPTOCURRENCY AND LEGAL TENDER CURRENCY

(71) Applicants: Lawrence Hilton, Highland, UT (US); Abraham Day, Highland, UT (US)

(72) Inventors: Lawrence Hilton, Highland, UT (US); Abraham Day, Highland, UT (US)

( * ) Notice: Subject to any disclaimer, the term of this patent is extended or adjusted under 35 U.S.C. 154(b) by 0 days.

(21) Appl. No.: 16/279,944

(22) Filed: Feb. 19, 2019

(65) Prior Publication Data

US 2019/0259025 A1 Aug. 22, 2019

Related U.S. Application Data

(60) Provisional application No. 62/632,368, filed on Feb. 19, 2018.

(51) Int. Cl.
*G06Q 20/38* (2012.01)
*G06Q 20/02* (2012.01)
(Continued)

(52) U.S. Cl.
CPC ......... *G06Q 20/381* (2013.01); *G06Q 20/027* (2013.01); *G06Q 20/0658* (2013.01);
(Continued)

(58) Field of Classification Search
None
See application file for complete search history.

(56) References Cited

U.S. PATENT DOCUMENTS 9,608,829 B2 * 3/2017 Spanos ................. H04L 9/3242
9,747,586 B1 * 8/2017 Frolov ............... G06Q 20/3678
(Continued)

FOREIGN PATENT DOCUMENTS

WO WO-2018002830 A1 * 1/2018 ............. G06Q 40/04

OTHER PUBLICATIONS

Anonymous; "Tether: Fiat currencies on the Bitcoin blockchain", from https://tether.to/wp-content/uploads/2016/06/TetherWhitePaper.pdf; Jun. 30, 2016. (Year: 2016).*
(Continued)

*Primary Examiner* — Jacob C. Coppola
(74) *Attorney, Agent, or Firm* — Steven Rinehart

(57) ABSTRACT

A system and method for performing transactions with exchangeable cryptocurrency and legal tender, and more particularly relates to system and method that utilizes a complementary legal tender currency subsystem for operating a banking module, a vaulting module, a legal tender fund module that has accounting information for complementary legal tender, a cache fund module, a crypto-currency module that has accounting information for virtual monetary tokens, a crypto-shares module that has accounting information for virtual share tokens, an escrow fund module, a trust fund module, a payment processing module, banking module, and vaulting module. The modules store, exchange, and maintain accounts for cryptocurrency and legal tender through a payment processing module. The payment processing module allows a customer and manager to transact for products and services through legal tender and cryptocurrency; and then generate revenue for the merchant through affiliate profits, trading the currencies for profit, and lower transaction fees.

11 Claims, 14 Drawing Sheets

(51) Int. Cl.
*G06Q 20/06* (2012.01)
*G06Q 20/22* (2012.01)
*G06Q 20/32* (2012.01)
*G06Q 20/36* (2012.01)
*G06Q 20/40* (2012.01)
*G06Q 40/12* (2023.01)

(52) U.S. Cl.
CPC ....... *G06Q 20/227* (2013.01); *G06Q 20/3223* (2013.01); *G06Q 20/3676* (2013.01); *G06Q 20/405* (2013.01); *G06Q 40/12* (2013.12); *G06Q 2220/00* (2013.01)

(56) References Cited

U.S. PATENT DOCUMENTS

| | | | | |
|---|---|---|---|---|
| 2010/0274728 A1* | 10/2010 | Kugelman | ........... | G06Q 50/188 705/28 |
| 2013/0262201 A1* | 10/2013 | Bergersen | .............. | G06Q 30/02 705/14.4 |
| 2016/0328705 A1* | 11/2016 | Sebag | .................. | G06Q 20/381 |
| 2017/0005804 A1* | 1/2017 | Zinder | .................. | H04L 63/123 |
| 2017/0024818 A1* | 1/2017 | Wager | .................. | G06Q 40/04 |
| 2017/0213210 A1* | 7/2017 | Kravitz | ................. | G06Q 30/06 |
| 2018/0068359 A1* | 3/2018 | Preston | ............. | G06Q 30/0283 |
| 2018/0189528 A1* | 7/2018 | Hanis | .................. | G06Q 10/087 |
| 2018/0204190 A1* | 7/2018 | Moy | ...................... | G06Q 40/04 |
| 2018/0240191 A1* | 8/2018 | Aronson | ............ | G06Q 20/3823 |
| 2019/0028276 A1* | 1/2019 | Pierce | .................... | G06Q 20/02 |
| 2019/0130484 A1* | 5/2019 | de Jong | ................ | G06Q 20/02 |
| 2019/0251526 A1* | 8/2019 | Jackson | ................ | G06Q 20/06 |

OTHER PUBLICATIONS

Eufemio et al., "Digix's Whitepaper: The Gold Standard in Crypto-Assets," version 1.02, available at https://www.weusecoins.com/assets/pdf/library/Digix%20Whitepaper%20-%20The%20Gold%20Standard%20in%20Crypto%20Assets.pdf (Year: 2016).*

Lipton A, Hardjono T, Pentland A. Digital trade coin: towards a more stable digital currency. R Soc Open Sci. Jul. 18, 2018;5(7):180155. doi: 10.1098/rsos.180155. PMID: 30109071; PMCID: PMC6083709. (Year: 2018).*

* cited by examiner

900
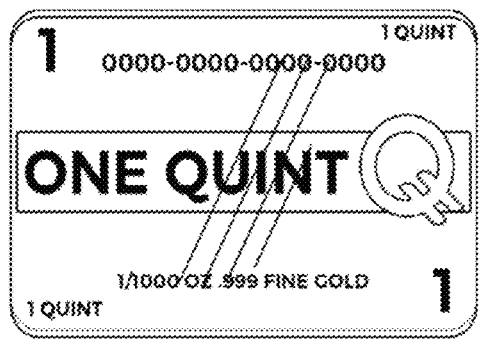
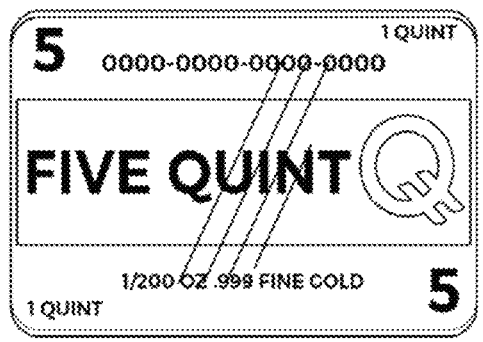
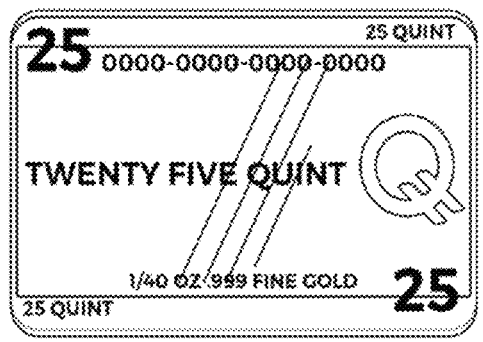
FIG. 9

1200

| The Payment Difference | | | $1,515 |
|---|---|---|---|
| Assumptions | | | |
| 1202 Business Sales | $100,000 | 25% | 75% |
| 1204 Recycled Quint | 15% | 70% | 30% |
| 1206 Sales-Driven Quint | 20% | | |
| 1208 Other Quint Issuance | 50% | | |
| Results | | | |
| 1210 Transaction Fees | $3,000 | $2,500 | +$500 |
| 1212 Recycled Quint | $0 | $315 | +$815 |
| 1214 Sales-Driven Quint | $0 | $200 | +$1,015 |
| 1216 Other Quint Issuance | $0 | $500 | +$1,515 |

FIG. 12

SYSTEM AND METHOD FOR PERFORMING TRANSACTIONS WITH EXCHANGEABLE CRYPTOCURRENCY AND LEGAL TENDER CURRENCY

FIELD OF THE INVENTION

This invention relates to a system and method for performing transactions with exchangeable cryptocurrency and legal tender, and more particularly relates to system and method that utilizes a complementary legal tender currency subsystem concurrently with a cryptocurrency system.

BACKGROUND

Description of the Related Art

Typically, the Blockchain is a cryptographically sound, decentralized, digital ledger that prevents double spending through requiring consensus amongst its entire network. Once a transaction takes place, that transaction is 'announced' to the whole network, and once verified, is accepted and forever stored in the digital ledger as having occurred. The majority of the network must confirm for a transaction to be recorded as true. This trustworthy, transparent, and decentralized ledger, called the Blockchain, has solved the double-spending problem and has led to the exponential growth of Bitcoin and other blockchain inspired ventures. A new age of entrepreneurism is likely upon us.

As powerful and revolutionary as cryptocurrency is, its inherent material value consists of ephemeral ones and zeros powered by electricity. It is hard to hold those things in your hand. The average person needs a lot of education to understand how something, which exists solely in a digital landscape, has a value of worth in the material world. But what if you could, just like you could before our dollars turned fiat, exchange your digital cash in for precious metals? Another commonly asked rhetorical question is, what if every coin on a network like Bitcoin had a guaranteed supply of real gold and silver to back it, redeemable and exchangeable on the classic common market, ensuring a base value to a digital asset.

At present, there are three types of consensus algorithms powering blockchains. Bitcoin uses a method referred to as Proof Of Work (PoW), and was the first known blockchain. PoW was a breakthrough and fostered decentralization in the early days, but the nature of PoW resource requirements (ASICs and energy) strongly incentivized centralization of mining and control, a problem that Proof Of Stake (PoS) and Delegated Proof Of Stake (DPoS) address.

DPoS is more efficient than Proof of Stake all together, and does provide more decentralisation than Proof of Work and Proof of Stake when it comes to rewarding block signing. It also provides much faster confirmed transactions on networks and for businesses that implement this technology.

Delegated Proof of Stake uses a type of reputation system and real time voting system to achieve consensus. What is different about this technology versus other consensus technologies is that a panel of trusted parties is established, and all members of that group are eligible to create blocks and prevent other non-trusted parties from doing so. These trusted parties are referred to as delegates, and are responsible for creating blocks on the network, however they are unable to change transaction details. A witness could prevent specific transactions from being included in a block; however, if a transaction is not included in a block, the next network block will be twice the size and will only slightly delay the transaction or block.

If any witness were to behave as a bad actor in that way or in other ways, a their behavior would be exposed. Stakeholders on the network can then vote to remove that particular delegate, and choose another block producer to take its place.

The amount of delegates required to run the network can be increased or decreased depending on needs and scalability, however all parties signing blocks in the network are of equal stake. This means it would require more than half of all block signers to collude in order to take over the network, however network stakeholders can remove those parties at any time, which makes it much more difficult to cheat the system or to take over the system through centralization of power.

Power usage to run the DPoS network is minimal, with each transaction using less than one second of laptop battery power versus an entire household for a week, as with PoW. This is environmentally friendly and allows the network to run without the use of expensive ASIC processors as well as massive energy and cooling costs.

DPoS was tested by the BitShares network in a stress test in March 2017 on geographically distributed nodes with peak processing rates of 3,328 transactions PER SECOND (199,680 transactions per minute) more than 10× the Waves (LPoS) stress test results. From these results, it was estimated that DPoS could be capable of up to 180,000 transactions per second if the network hardware used in the test were to be scaled to meet transactional demand. By comparison, VISA network is capable of handling 24,000 transactions per second, NASDAQ with recent system improvements increased its capability to a little more than 10,000 per second, and MasterCard comes in at 38,000 per second.

DPoS technology is currently responsible for processing more than half of all daily transactions in the entire blockchain industry, and is capable of processing every transaction on the blockchain daily with no congestion or overflow. DPoS blockchains have also been operational for several years, currently hold the record for most processed transactions per day, the longest blockchain, and are the fastest confirmed secure transactions available.

The type of work being conducted in order to mine and power the network is a complex set of math problems where the probability of mining a block is dependent on how much work is done by the miner. Miners compete for blocks with ever increasing difficulty, and have to upgrade constantly to newer, faster hardware in order to continue to mine. Because of this, each Bitcoin transaction today uses as much electricity as it would take to power a U.S. Household for an entire week. This method is not economically or ecologically sound, and requires massive scale that exacerbates the problem. In recent research, experts argued that bitcoin transactions may consume as much if not more electricity as Denmark by 2020.

PoW has also proven to be not as decentralized as other consensus models. Due to the inherent reward system based on computational power, miners typically pool together into mining pools in order to compete for block rewards. This has created a centralized hierarchy within Bitcoin, with only three or four mining groups controlling the majority of block production. Because of this, the miners themselves are a source of centralization.

Bitcoin also suffers from congestion problems due to the PoW reward system, and is now processing maximum transactional capability with a long queue of transactions in an overflow. This causes delayed transactions and results in much higher fees for transaction transmission.

Another consensus algorithm is known as Proof Of Stake (PoS). Unlike the proof-of-Work, where the algorithm rewards miners who solve mathematical problems with the goal of validating transactions and creating new blocks, with the PoS, the creator of a new block is chosen in a deterministic way, depending on its wealth, also defined as stake.

In PoS, there is no block reward, the miners instead take transaction fees, and are referred to as forgers, and the forgers are always those who own the coins minted. As with Bitcoin, PoS also has massive problems with network congestion and rising fees associated with increased usage and adoption. A perfect example is the CryptoKitties smart-contract that launched on the Ethereum network in the winter of 2017. In December, CryptoKitties was responsible for over 20% of the total traffic on the Ethereum network, and caused network congestion to reach unprecedented levels. Fees also rose massively with congestion, with several companies and exchanges having to freeze operations until the congestion subsided to manageable levels. Ethereum network currently sits at one hundred percent utilization of its transactional capabilities, with transactions also in an overflow queue. With increased adoption, one can surmise that this problem will continue.

As with PoW, centralization also appears to be the case with a majority of forging being pooled into a few entities. At present only two to three pools control well over the majority of computational power on the Ethereum network.

It is known in the art that the United States has authorized as "legal tender for all debts, public charges, taxes, and dues" various kinds of legal tender currency, namely Federal Reserve notes and base metal coinage (collectively "Paper" currency), and precious metal coin (collectively "Specie" currency). See 31 U.S.C.A. § 5103 & 5112(h). In an exercise of constitutionally reserved monetary powers, some of the several states have likewise made "gold and silver coin a tender in payment of debts". See, art. I, § 10, cl. 1 of the United States Constitution; See also, Arizona Revised Statutes Annotated § 43-1121, et seq.; Colorado Revised Statutes Annotated § 11-61-101; Vernon's Annotated Missouri Statutes § 408.010; Oklahoma Statutes § 62-4500; and Utah Code Annotated § 59-1-1501, et seq.; and Wyoming Statutes Annotated § 9-4-1301 et seq.

The U.S. Secretary of the Treasury is statutorily required "to maintain the equal purchasing power of each kind of United States currency." See 31 U.S.C.A. § 5119(a). For nearly the first two centuries of U.S. history, with only rare exceptions, substantial purchasing-power equilibrium indeed prevailed between the various types of U.S. currency. Over the past four to five decades, however, the purchasing power of Paper legal tender and Specie legal tender currencies has diverged considerably.

Congress has enacted laws reflecting a public policy highly supportive of the circulation of Specie legal tender as a complement to the predominant, debt-based, Paper legal tender. For example, 31 U.S.C.A. § 5116(2) requires that "amounts received from the sale of gold shall be deposited by the Secretary in the general fund of the Treasury and shall be used for the sole purpose of reducing the national debt." In addition, as a measure clearly designed to benefit the U.S. economy, federal law directs the Secretary of the Treasury to mint enough gold dollars "to meet public demand" and to do so "by purchase from the natural deposits of the United States." 31 U.S.C.A. §§ 5112(e), (i)(1) & 5116 (a)(3).

Nevertheless, implementation issues have hampered the full realization of certain aspects of the Specie legal tender currency system enacted by Congress. Such problems include: (1) buy/sell spreads; (2) limited acceptance; (3) potentially adverse tax treatment; (4) counterfeit coin risk; and (5) inadequate as well as non-interchangeable denominations. These issues exist to varying degrees in other countries and jurisdictions as well.

SUMMARY

From the foregoing discussion, it should be apparent that a need exists for a system and method for performing transactions with exchangeable cryptocurrency and legal tender. Beneficially, such a system and method would provide a complementary legal tender currency apparatus that operates multiple modules for storing, exchanging, and maintaining accounts for cryptocurrency and legal tender; and further enabling payment means between the modules with a unique payment processing module.

The present invention has been developed in response to the present state of the art, and in particular, in response to the problems and needs in the art that have not yet been fully solved by currently available cryptocurrency exchange models. Accordingly, the present invention has been developed to provide a system and method for performing transactions with exchangeable cryptocurrency and legal tender that overcome many or all of the above-discussed shortcomings in the art.

A system and method for performing transactions with exchangeable cryptocurrency and legal tender, and more particularly relates to system and method that utilizes a complementary legal tender currency subsystem for operating a banking module, a vaulting module, a legal tender fund module, a cache fund module, a crypto-currency module, a crypto-shares module, an escrow fund module, a trust fund module, a payment processing module, a banking module, and a vaulting module.

The modules store, exchange, and maintain accounts for cryptocurrency and legal tender through use of a unique payment processing module. A legal tender fund module maintains accounting information for complementary legal tender currency. A cache fund module maintains accounting information for cached complementary currency. A crypto-currency module maintains accounting information for virtual monetary tokens that correspond to the physical complementary legal tender currency accounted for by the legal tender fund module. The monetary tokens are payable upon demand for physical complementary legal tender currency of corresponding value. A crypto-shares module maintains accounting information for virtual share tokens that correspond to the physical cached complementary currency accounted for by the cache fund module.

The system and method provides a complementary legal tender currency subsystem that contains multiple modules that contain accounting information for cryptocurrency and legal tender currency. The modules may include, without limitation, a banking module, a vaulting module, a legal tender fund module, a cache fund module, a crypto-currency module, a crypto-shares module, an escrow fund module, and a trust fund module. The modules store, exchange, and maintain accounts for cryptocurrency and legal tender. A unique payment processing module facilitates transactions and currency exchange to and from the modules, while also allowing a merchant to profit from the transactions and exchanges.

In some embodiments, the system may include a legal tender fund module that maintains accounting information for complementary legal tender currency. The complementary legal tender currency is physically stored in one or more secure facilities.

In one non-limiting embodiment, the complementary legal tender currency may include a piece of durable material comprising a whole number denomination in units of a precious metal wherein the unit is a fraction of a troy ounce. The piece of durable material may include a predetermined outer form comprising the piece. Further, a legible designation of the denomination is securely disposed on the outer form. This may include a gold or silver coin recognized in a governmental jurisdiction.

The system may also provide a cache fund module that maintains accounting information for cached complementary currency. The cached complementary currency is physically stored in one or more secure facilities.

The system may also provide a crypto-currency module that maintains accounting information for virtual monetary tokens that correspond to the physical complementary legal tender currency accounted for by the legal tender fund module. The monetary tokens are payable upon demand for physical complementary legal tender currency of corresponding value.

The system may also provide a crypto-shares module that maintains accounting information for virtual share tokens that correspond to the physical cached complementary currency accounted for by the cache fund module. In this manner, a number of share tokens represent ownership of a percentage of the physical cached currency. The percentage is that of the number of share tokens owned as a percentage of total share tokens outstanding. In this manner, both the monetary tokens and the share tokens are configured to be exchanged; whereby such exchanges are also accounted for in the accounting information of the legal tender fund module and of the cache fund module.

In this manner, the legal tender fund module, the cache fund module, the crypto-currency module and the crypto-shares module comprise one or more of logic hardware and executable code, the executable code stored on one or more non-transitory computer-readable media.

A payment processing module allows a customer and merchant to transact for products and services through legal tender and cryptocurrency. The merchant may generate revenue through affiliate profits, trading the currencies for a profit, and lower transaction fees.

In another aspect, the exchange of monetary tokens and share tokens comprises one or more of purchase, sale, reinvestment, redemption, and payment of a dividend.

In another aspect, the system further comprises an escrow fund module that maintains accounting information for predominant legal tender currency, wherein the predominant legal tender currency are configured to be exchanged for complementary currency, wherein such exchanges are also accounted for in the accounting information of the legal tender fund module and of the cache fund module.

In another aspect, the system further comprises a trust fund module that maintains accounting information for investment assets including predominant legal tender currency, wherein the investment assets are configured to be exchanged for complementary currency, wherein such exchanges are also accounted for in the accounting information of the escrow fund module, of the legal tender fund module and of the cache fund module.

In yet another aspect, at least some of the accounting information is maintained in a distributed ledger.

In yet another aspect, the distributed ledger comprises a blockchain.

In yet another aspect, the complementary legal tender currency comprises precious metal coinage that is recognized as legal tender in a governmental jurisdiction.

In yet another aspect, the value of the virtual monetary token is based on a price of the physical complementary legal tender currency as denominated in the predominant legal tender currency and published by the governmental jurisdiction.

In yet another aspect, a portion of the value from a transaction is placed in the cache fund and corresponding virtual shares are issued to a recipient of the virtual monetary tokens under the transaction.

In yet another aspect, a portion of the value from a transaction is placed in the trust fund for a trust organization that operates on behalf of trustors for whom the accounting information is maintained.

A method of the present invention is also presented for performing transactions with a payment processing module. The method in the disclosed embodiments substantially includes the steps necessary to carry out the functions presented above with respect to the operation of the described system and method. In one embodiment, the method includes an initial Step of selling, by a merchant, a product or service having a price.

The method may also include a Step of identifying, by a customer, the product or service and the price.

A Step comprises registering, by the customer, a payment card identifier with a payment processing module.

Another Step for the method may include providing the merchant with a commission when the customer registers.

Yet another Step comprises transmitting, by the customer, a customer unique identifier to the payment processing module through a mobile communication device.

The method also provides a Step of transmitting, by the payment processing module, a passcode and instructions to the customer.

A Step comprises transmitting, by the customer, the passcode, the payment card identifier, and a mobile device identifier.

The method includes a Step of requesting, by the customer, an amount of first currency at least equal to the price of the product or service to the payment processing module.

Another Step comprises receiving, by the customer, sufficient first currency to pay the price of the product or service to the merchant.

A Step includes receiving, by the customer, additional first currency if the requested amount of currency is greater than the price of the product or service.

In another embodiment, a Step includes generating a fee for the customer purchase transaction.

A Step comprises depositing the fee in at least one of the following: a cache fund module, an escrow fund module, and a trust fund module.

A final Step comprises exchanging, by the merchant, the first currency for a second currency, whereby the exchange generates a profit for the merchant.

In another aspect of the method, the customer unique identifier comprises an email address.

In another aspect, the mobile device identifier comprises a phone number.

In another aspect, the first currency comprises a quint.

In another aspect, the second currency comprises a legal tender or a crypto-currency.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 illustrates gold Quint cards, in accordance with the present invention;

FIG. 12 is a spreadsheet showing a Quintric Payment Difference, showing the advantages and profits generated from the transaction of Quints, in accordance with the present invention;

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
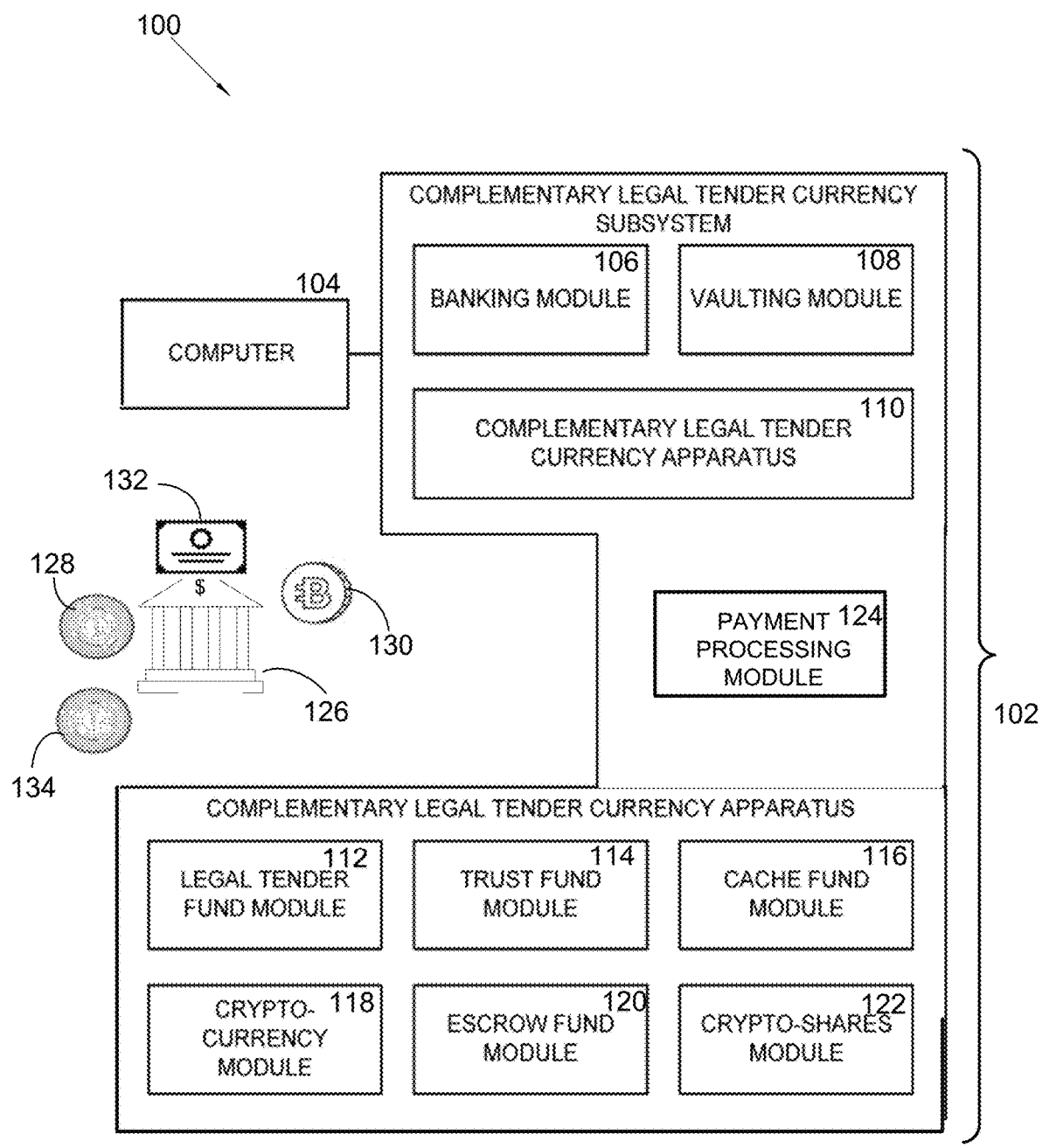
FIG. 1 is a perspective view illustrating one embodiment of a system and method for performing transactions with exchangeable cryptocurrency in accordance with the present invention.

FIG. 1 is a schematic block diagram illustrating a system 100 of a present embodiment, including a computer 104 operatively connected to a complementary legal tender currency subsystem 102. The subsystem 102 comprises a complimentary legal tender currency apparatus 110. The apparatus 110 helps operate a banking module 106 and a vaulting module 108. In an embodiment, the foregoing components of the subsystem 102 may be fully or partially implemented within a hardware platform and/or a software stack of the computer 104.

The subsystem 102 may enable exchange of virtual monetary tokens 128 and virtual shares 132 in a way that combines the benefits of non-taxable legal tender with the potential for capital gains in the cryptocurrency market. The banking module 106 may maintain accounting information for predominant legal tender currency. The predominant legal tender currency may be held in accounts with one or more financial institutions 126. The vaulting module 108 may maintain accounting information for a complementary currency. The complementary currency may be physically stored in one or more secure facilities.

Continuing with FIG. 1, the complementary legal tender currency subsystem 102 includes a legal tender fund module 112, a cache fund module 116, a crypto-currency module 118, a crypto-shares module 122, an escrow fund module 120, a trust fund module 114, and a payment processing module 124.

The legal tender fund module 112 may maintain accounting information for complementary legal tender currency 128. Those skilled in the art will recognize that legal tender is a special kind of personal property, constituting government authorized coins, currencies and bank notes legally approved to serve as a medium of exchange and for payment of public and private obligations.

For purposes of the present invention, the complementary legal tender currency 128 may be physically stored in one or more secure facilities, as also accounted for by the vaulting module. The legal tender can include gold coins and paper money.

In another embodiment, the legal tender includes the Quintric™ monetary system, combines the legitimacy, accountability and security of gold and silver ("specie") legal tender with the transparency, flexibility and convenience of distributed, blockchain technology to create the world's first authentic, interoperable family of specie legal tender cryptocurrencies. The Quintric system consists of five distinct, inter-dependent, specie-based tokens: Quint™; QuintS™; iQuint™; iQuintS™; and QuintX™.

Each Quint token certifies five U.S. gold cents (1/1,000th of a troy ounce) held on deposit by Quintric payable to the bearer on demand in one-ounce, fifty dollar face value, U.S. American Eagle or American Buffalo gold coin, at 1,000 tokens per coin. Quint is one of the four "Monetary Tokens", along with QuintS, iQuint and iQuintS.

Each QuintS token certifies five U.S. silver cents (1/20th of an ounce) held on deposit by Quintric payable in one-ounce, one dollar face value, American Eagle/Walking Liberty silver coin, at a rate of 20 tokens per coin.

Each iQuint token equates to 1/1,000th of a troy ounce of gold redeemable in 1,000 token increments in any one of the following five, one-ounce legal tender coins: (1) The Austrian Philharmonic; (2) The Australian Kangaroo; (3) The British Sovereign; (4) The Canadian Maple Leaf, or (5) The Chinese Panda. Alternatively, smaller increments of iQuint tokens may also be redeemed.

For purposes of the present invention, each iQuintS token equates to 1/20th of a troy ounce of silver redeemable in the silver versions of the legal tender offerings described above.

A QuintX token represents a proportionate share of the QuintCache—a trust fund maintained by Quintric to hold small transaction fees assessed in Monetary Tokens. QuintX tokens emerge as a by-product of the creation of Quintric Monetary Tokens through the deposit of legal tender into the system coupled with the generation of an accompanying crypto token as a receipt. Monetary Token creators who qualify as accredited investors may be awarded QuintX tokens directly. For non-accredited investors, such tokens may be placed into a donor-advised fund, over which the token holder may exercise advisory rights regarding the ultimate disposition of any value generated thereby for qualified charitable purposes. Alternatively, QuintX tokens may be sold to the general public as registered securities or as securities exempt from registration.

Continuing with the modules, the cache fund module 116 may maintain accounting information for cached complementary currency. The cached complementary currency may be physically stored in one or more secure facilities, as also accounted for by the vaulting module. Thus, every time a transaction occurs, a percentage is transferred to the cache fund module (See FIG. 4).

The crypto-currency module 118 may maintain accounting information for virtual monetary tokens 130 that correspond to the physical complementary legal tender currency accounted for by the legal tender fund module 112. The virtual monetary tokens 130 may be payable upon demand for physical complementary legal tender currency 128 of corresponding value.

The crypto-shares module 122 may maintain accounting information for virtual share tokens 132 that correspond to the physical cached complementary currency accounted for by the cache fund module 116, wherein a number of the virtual share tokens 132 may represent ownership of a percentage of the physical cached currency. The percentage may be that of the number of virtual share tokens owned as a percentage of total share tokens outstanding. The virtual monetary tokens 130 and the virtual share tokens 132 may be able to be exchanged. Such exchanges may also be accounted for in the accounting information of the legal tender fund module 112 and of the cache fund module 116.

The escrow fund module 120 may maintain accounting information for predominant legal tender currency 134. The predominant legal tender currency 134 may be able to be exchanged for complementary currency. Such exchanges may also be accounted for in the accounting information of the banking module 106, of legal tender fund module 112 and of the cache fund module 116.

The trust fund module 114 may maintain accounting information for an investment asset, including the predominant legal tender currency 134. The trust fund module is similar to an endowment that pays for vaulting the legal tender currency. This allows for zero carrying costs. The investment assets may be able to be exchanged for complementary currency. Such exchanges may also be accounted for in the accounting information of the banking module 106, of the escrow fund module 120, of the legal tender fund module 112, and of the cache fund module 116.

In one embodiment, the exchange of virtual monetary tokens and virtual share tokens may be a purchase, sale, reinvestment, redemption, payment of a dividend, and so forth. In a further embodiment, at least some of the accounting information may be maintained in a distributed ledger, such as a blockchain or the like.

In another embodiment, the complementary legal tender currency may be precious metal coinage 800 that is recognized as legal tender in a governmental jurisdiction. The value of the virtual monetary token 130 may be based on a price of the physical complementary legal tender currency 128 as denominated in the predominant legal tender currency 134 and published by the governmental jurisdiction.

In one embodiment, a portion of the value from a transaction may be placed in the cache fund module 116 and corresponding virtual share tokens 132 issued to a recipient of the virtual monetary tokens 130 under the transaction. In a further embodiment, another portion of the value from the transaction may be placed in the trust fund module 114 for a trust organization that operates on behalf of trustors for whom the accounting information is maintained.

The accumulation of complementary legal tender for currency (CLTC, e.g. Specie currency), and the payment of debts, public charges, taxes, and dues employing as media of exchange one or more CLTCs in addition to, or other than, the predominant legal tender currency (PLTC, e.g. Paper currency) which is the base currency of the jurisdiction in question. The present invention may include one or more commodity hedge, legal tender reserve, legal tender escrow, and legal tender holding accounts denominated in either a particular CLTC or PLTC (collectively "Currency") held or handled by one or more depository institutions, bullion repository, bill payment money service, money service business, financial institution, commodity repository or escrow agent, or other fiduciary (collectively "FID").

The present invention may provide for regularly updated exchange rates based on key market indices and/or actual acquisition costs denominated in the PLTC for each CLTC included in the system. The invention may first receive Currencies or commodities of which CLTC currencies are composed into escrow from a depositor with instructions for physical conversion of the same into one or more CLTC holdings by means of one or more transactions at the prevailing exchange rate over a conversion period for purposes of achieving conversion cost averaging. CLTC may be held in trust for the account holder or for the account holder's assignee and may be insured against loss.

Figure 2:
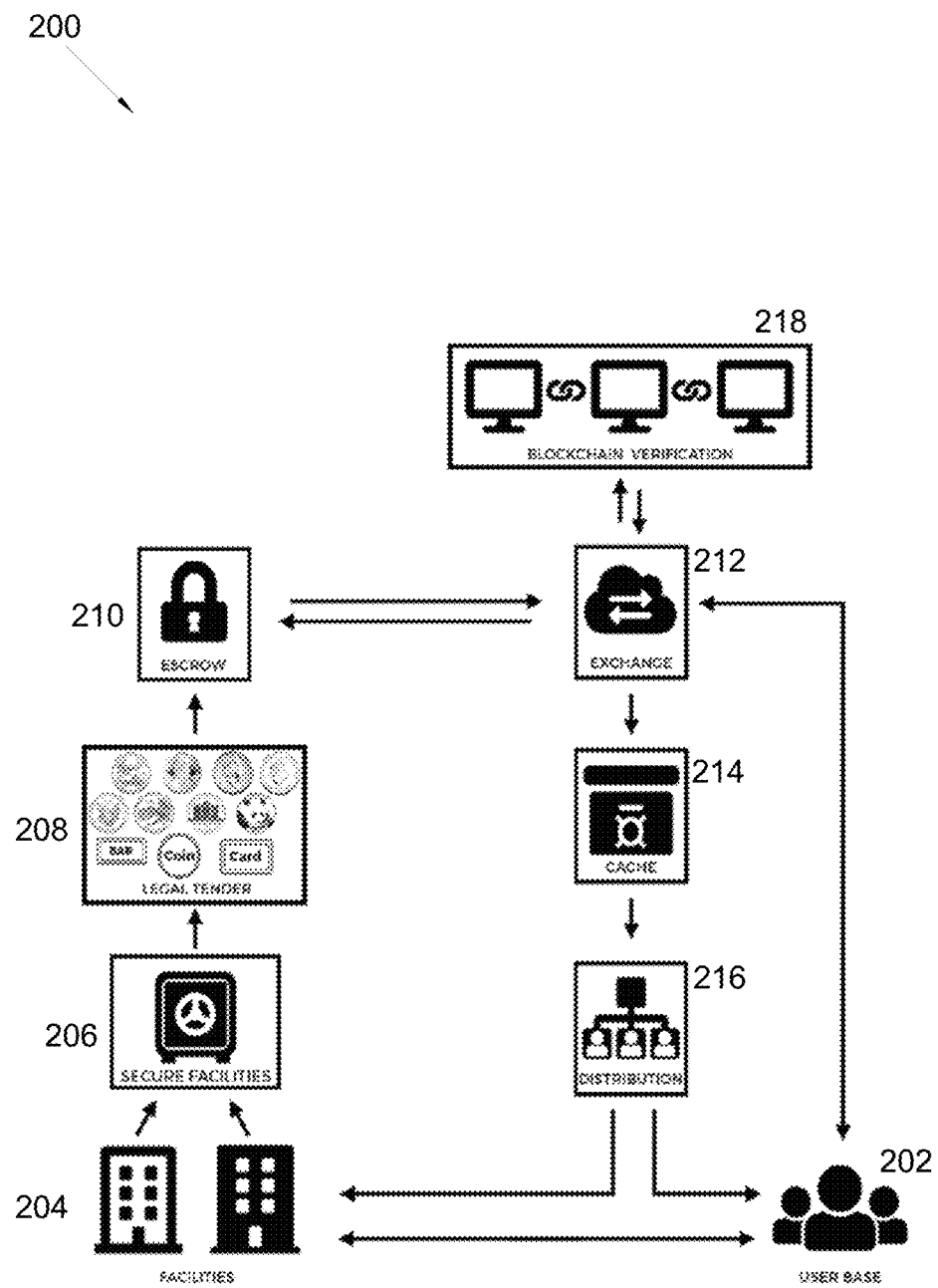
FIG. 2 is a process flow chart to show how a depositor creates concurrent Crypto-Tokens and Legal Tender, in accordance with the present invention.

As shown in the block diagram of the system 200 in FIG. 2, a customer 202 may create accounts from one or more institutions 204. Crypto-Tokens may represent legal tender that is held in secure facilities 206. Corresponding legal tender 208 is acquired and placed in these secure facilities. The vaulted gold, silver and platinum are certified by the created Crypto-Tokens that are purchased and may be considered a certificate that may be surrendered for Legal Tender on demand. Escrow services 210 allow users to keep Crypto-Token balances in escrow and on one or more exchanges. This may protect account numbers from being lost. Exchange platforms 212 may allow for transactions and changing of hands of the Crypto-Tokens. Blockchain verification 218 happens when transactions occur. Transaction fees flow from the exchange platforms 212 into the Cache Fund 214. The Bonus Crypto-Tokens may be distributed proportionately to the holders of Share Tokens as distributions 216 from the Cache Fund 214. Transaction fees accrue as Crypto-Tokens in the Cache Fund to be held for later distribution to the holders of the Bonus Crypto-Tokens.

Figure 3:
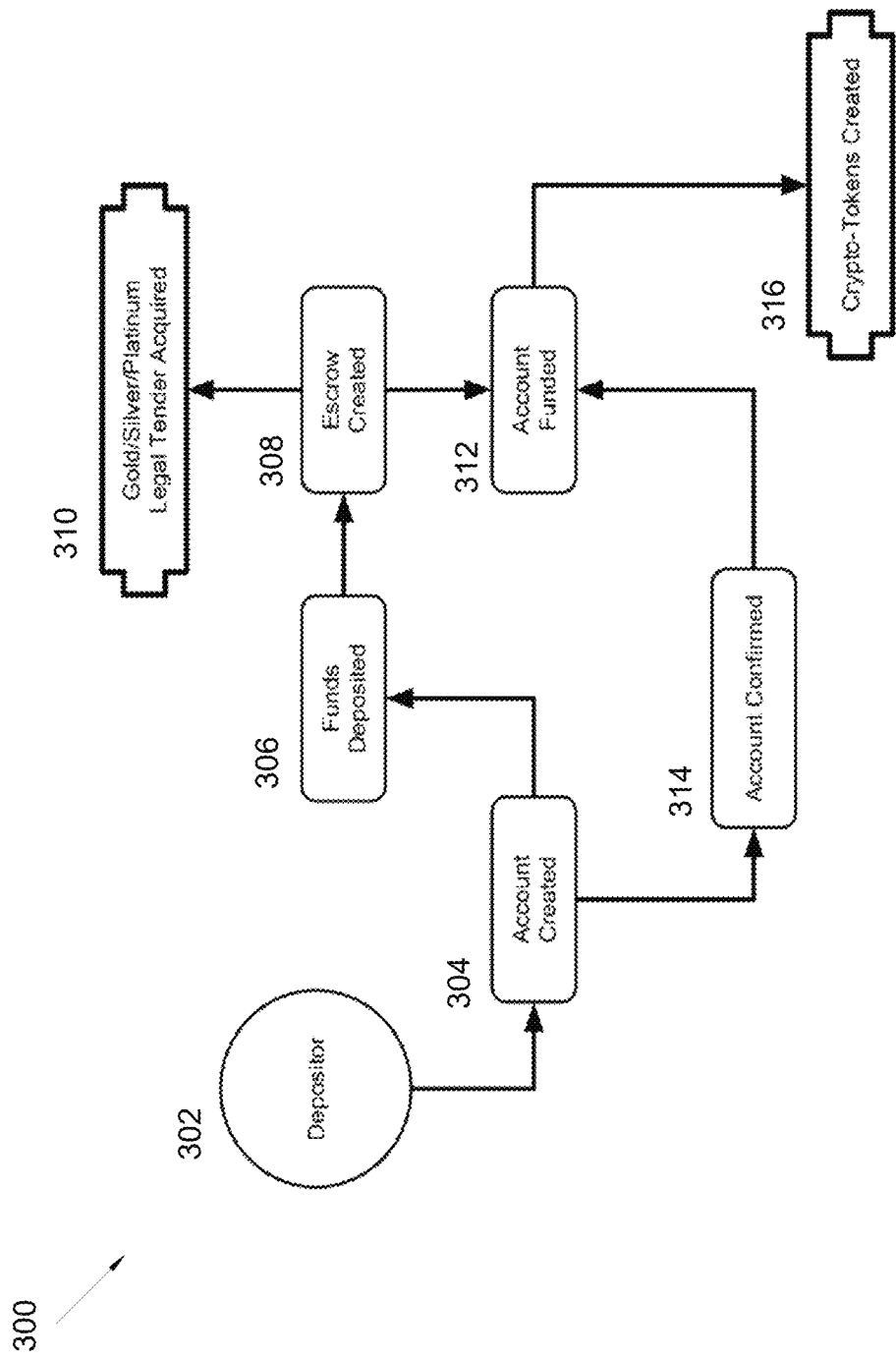
FIG. 3 is a process flow chart to show how a depositor creates concurrent Crypto-Tokens and Legal Tender.

FIG. 3 illustrates a process 300 flow chart to show how a depositor 302 may create concurrent Crypto-Tokens and Legal Tender. A depositor may create an account 304. The account is confirmed 314. Next, the funds are deposited 306. An escrow service acquires the Legal Tender 308. The account is funded with concurrent Crypto-Tokens 312. Further, gold/silver/platinum legal tender are acquired 310. Finally, the Crypto-Tokens are created 316.

In some embodiments, a process flow chart to show how Crypto-Tokens may create Bonus Crypto-Tokens. The Crypto-Tokens are held in escrow and may be pushed to the trading platform. The Bonus Crypto-Tokens may also be pushed to the trading platform.

Figure 4:
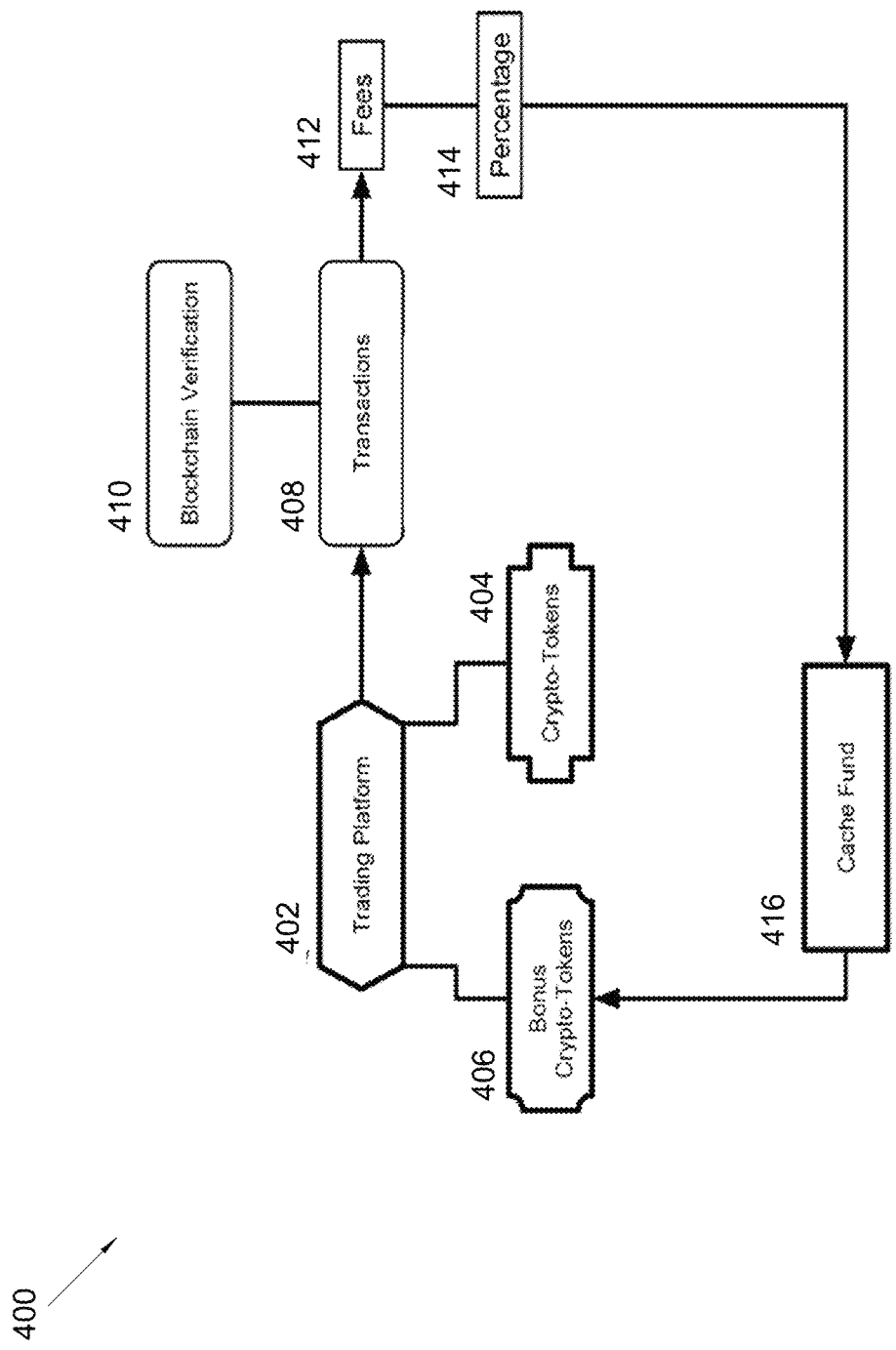
FIG. 4 is a process flow chart showing how a trading platform may operate which supports the issuance of both Crypto-Tokens and Share Tokens, in accordance with the present invention.
Figure 5:
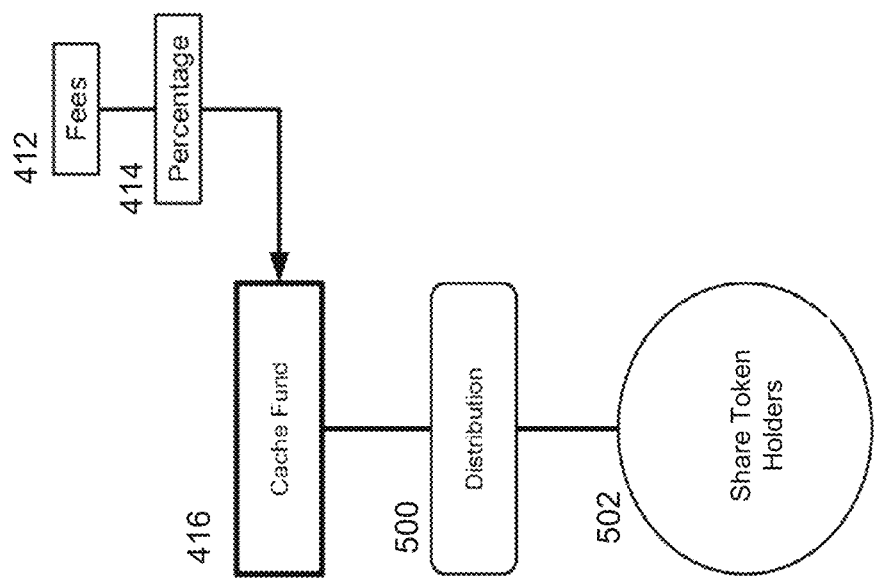
FIG. 5 is a process flow chart to show how cache distributions may work. When fees occur, a percentage is held in a Cache Fund, in accordance with the present invention.

FIG. 4 illustrates a process 400 flow chart to show how a trading platform 402 may work that supports the issuance of both Crypto-Tokens 404 and Bonus Crypto-Tokens 406. As transactions 408 occur they are verified using blockchain technology 410 and incur a transaction fee 412, a percentage 414 of which is allocated to the Cache Fund 416. The Cache fund 416 holds the Bonus Crypto-Tokens 406. FIG. 5 illustrates a continuation of process 400 flow chart to show how cache distributions may work. When fees 412 occur, a percentage 414 is held in a Cache Fund 416. Proportional distribution 500 may occur to the Bonus Crypto-Token Holders 502 from time to time.

Figure 6:
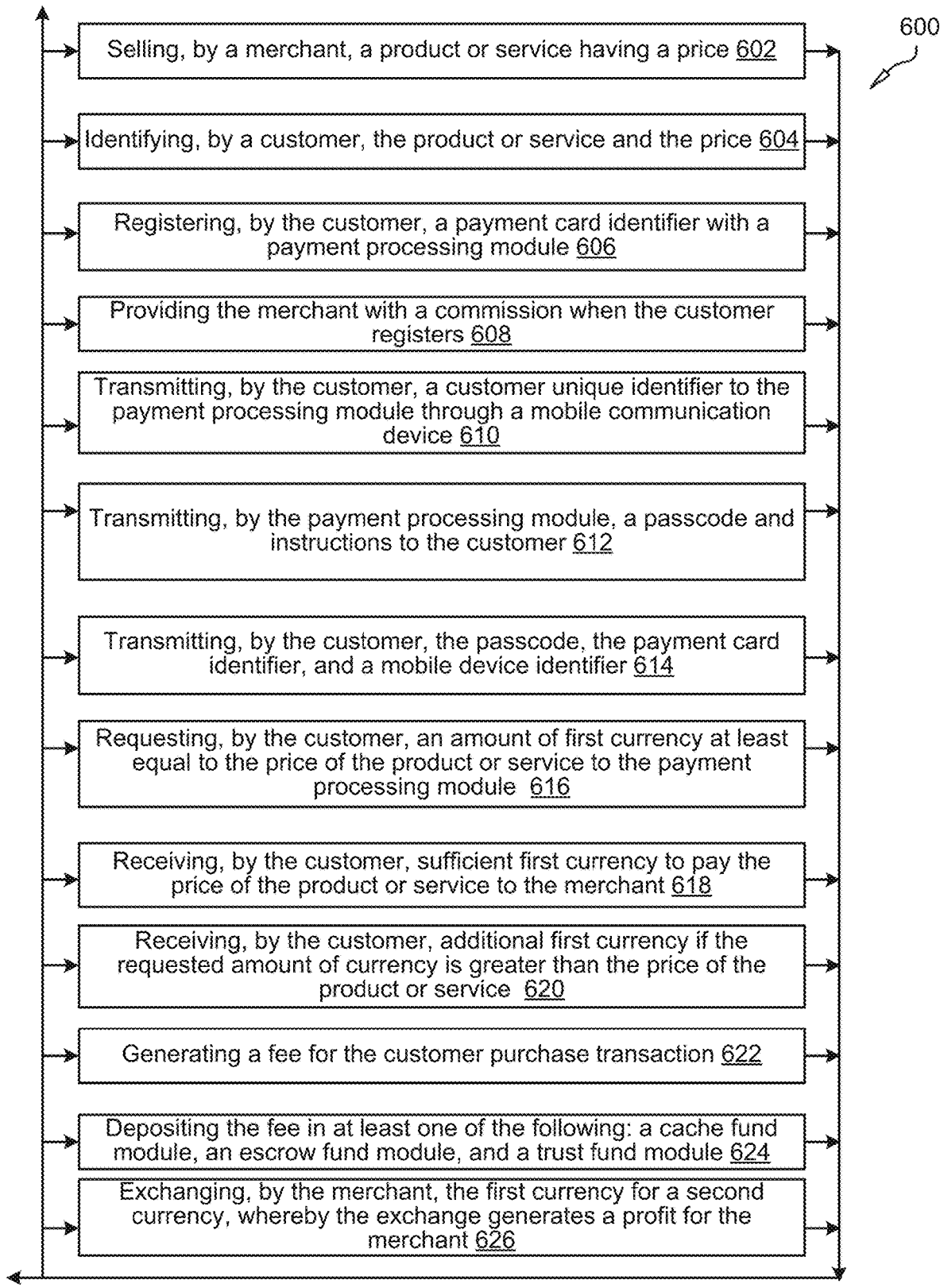
FIG. 6 is a process flow chart for performing transactions with a payment processing module, in accordance with the present invention.

FIG. 6 illustrates an exemplary method 600 for performing transactions with a payment processing module. The method 600 in the disclosed embodiments substantially includes the steps necessary to carry out the functions presented above with respect to the operation of the described system and method 600. In one embodiment, the method 600 includes an initial Step 602 of selling, by a merchant, a product or service having a price. The product or service is sold with the intent to receive legal tender or virtual monetary tokens for compensation.

The method 600 may also include a Step 604 of identifying, by a customer, the product or service and the price. The customer may include an individual, an organization, a company, and the like.

A Step 606 comprises registering, by the customer, a payment card identifier with a payment processing module. The payment card identifier is from a payment card, such as a credit card. This may include a card number, a card expiration date, and a card code.

Another Step 608 for the method 600 may include providing the merchant with a commission when the customer registers and creates Monetary Tokens. The registration may include providing a name, contact information, and other personal information.

Yet another Step 610 comprises transmitting, by the customer, a customer unique identifier to the payment processing module through a mobile communication device. The customer unique identifier may include an email address. The mobile communication device may include a smart phone, a tablet, and a laptop.

The method 600 also provides a Step 612 of transmitting, by the payment processing module, a passcode and instructions to the customer. The customer receives a text message with the passcode. This is a verification and authorization for the customer to access the legal tender or virtual currency.

A Step 614 comprises transmitting, by the customer, the passcode, the payment card identifier, and a mobile device identifier. In one non-limiting embodiment, the mobile device identifier is a phone number. This is a personal identification means.

The method 600 includes a Step 616 of requesting, the customer, an amount of first currency at least equal to the price of the product or service to the payment processing module. The first currency comprises a quint. The quint may include a silver QuintS coin 800. In this embodiment, one QuintS represents 1/20 of an ounce of fine silver in the form of a coin. Five QuintS represents 1/4 of an ounce of fine silver in the form of a coin. Twenty QuintS represent 1 ounce of fine silver in the form of a coin.

The quint may also include a gold Quint card 900. One Quint represents 1/1000 of an ounce of fine gold in the form of a card containing the gold. Five Quint represents 1/200 of an ounce of fine gold in the form of a card containing the gold. Twenty-five Quint represents 1/40 of an ounce of Fine Gold in the form of a card containing the gold.

Another Step 618 comprises receiving, by the customer, sufficient first currency to pay the price of the product or service to the merchant. The customer receives the Quint coin or Quint card 900 as needed to purchase the product or service.

A Step 620 includes receiving, by the customer, additional first currency if the requested amount of currency is greater than the price of the product or service.

In another embodiment, a Step 622 includes generating a fee for the customer purchase transaction. A portion of the transaction is deposited in the escrow fund module, for vaulting costs and the like.

A Step 624 comprises depositing the fee in at least one of the following: a cache fund module, an escrow fund module, and a trust fund module.

A final Step 626 comprises exchanging, by the merchant, the first currency for a second currency, whereby the exchange generates a profit for the merchant. In some embodiments, the second currency may include a legal tender or a crypto-currency. The merchant benefits in four primary ways: 1) affiliate commissions; 2) buying and selling the Quints and profiting from the difference in price; 3) lower transaction fees; and 4) converting from a non-preferred form of legal tender to a preferred form of legal tender at no buy-sell spread.

FIG. 12 is a spreadsheet showing a Quintric Payment Difference 1200, showing the advantages and profits generated from the transaction of Quints. The Quintric Payment Difference 1200 references demonstrates how the merchant may benefit from transacting with Quints. In the example, a business sales volume 1202 for a certain time period, or cost of the product or service sold during that time period is $100,000. The business sale costs about $3,000 in transaction fees. Assuming 25% of that amount is settled in Quint the transaction fee 1210 is only 25%, or $2500; while with normal credit card payment means this can be 75%, or $3,000. There is a $500 advantage to transacting with Quint.

Another advantage comes from recycled quint 1204. This is the difference in quint prices that the merchant profits. This generates recycling revenue 1212, which is shown to be $315. A sales-driven quint 1206 represents the affiliate commissions a merchant earns by selling new Quint to a customer for use in purchasing the merchant's product or service. This can include an organic commission 1214, which is about $200 with Quint, for the $100,000 example. Alternatively, the merchant could sell its own Quint to a customer for Paper legal tender and thus execute a currency exchange at no buy/sell spread. The Quintric Payment Difference 1200 also includes other Quint issuances 1208, which produces external Quint revenue 1216, which is about $500. The resultant revenue generated for the merchant in this case is about $1515.

Figure 7:
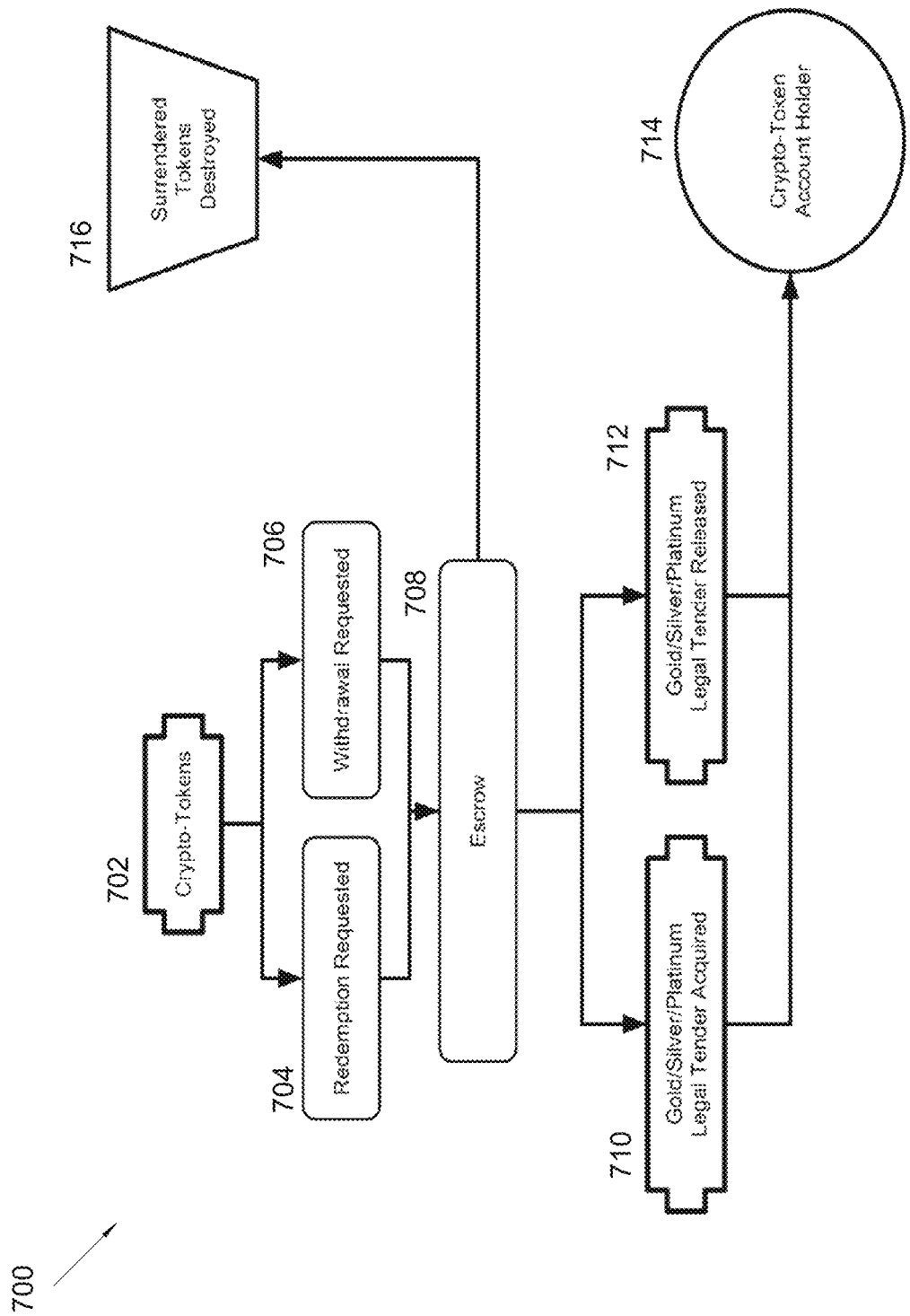
FIG. 7 is a process flow chart to show how Crypto-Tokens are redeemed or withdrawn upon request of the Crypto-Token Holder, in accordance with the present invention.

FIG. 7 illustrates a process 700 of a flow chart to show how Crypto-Tokens 702 may be redeemed or withdrawn upon request of the Crypto-Token Holder 714. The individual or customer can request to redeem 704 the Crypto-Tokens. Additionally, the individual or customer can request to withdraw 706 the Crypto-Tokens. Upon request of the Crypto-Token Holder, the Gold, Silver, or Platinum may be requested to be acquired 710, and/or withdrawn/released 712 through escrow services 708. The corresponding surrendered Crypto-Tokens are destroyed 716.

Figure 8:
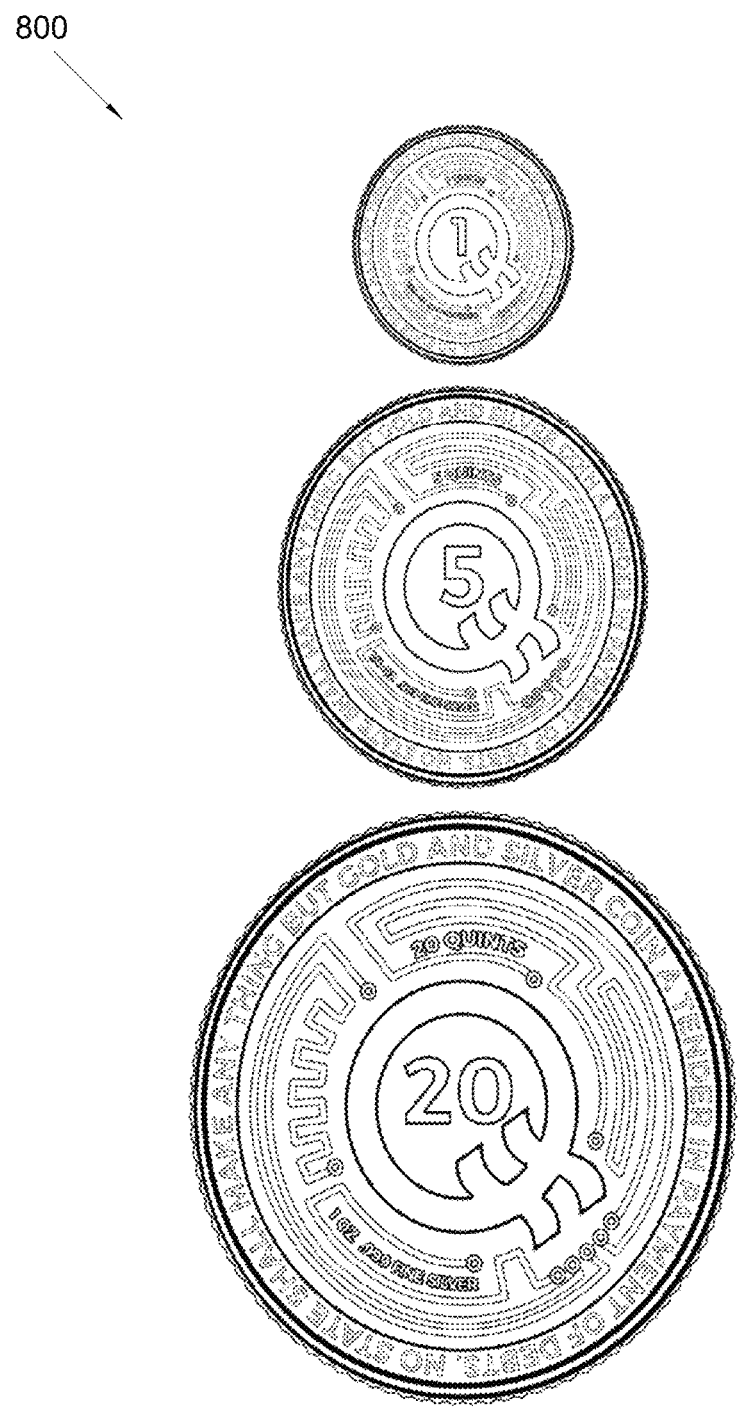
FIG. 8 illustrates representing silver QuintS coins, in accordance with the present invention.

FIG. 8 illustrates a representation of silver QuintS coins 800. One QuintS represents ¹⁄₂₀ of an ounce of fine silver in the form of a coin. Five QuintS represents ¼ of an ounce of fine silver in the form of a coin. Twenty QuintS represent 1 ounce of fine silver in the form of a coin. In an embodiment, at least one of the complementary currencies may comprise a piece of durable material comprising a whole number denomination in Quint of a precious metal wherein Quint may denote one thousandth of a troy ounce of gold, one twentieth of a troy ounce of silver, or one two-thousandth of a troy ounce of platinum, a predetermined outer form comprising the piece, and a legible designation of the denomination securely disposed on the outer form. As illustrated, the durable material may comprise a metallic alloy, the precious metal may comprise gold or silver, the piece may comprise a round, and the outer form may comprise a coin or a note.

See FIG. 9, illustrations representing gold Quint cards 900. One Quint represents ¹⁄₁₀₀₀ of an ounce of fine gold in the form of a card containing the gold, with any remained vaulted, in which case the card or note would have a crypto wallet address constituting a claim to the vaulted gold. Five Quint represents ¹⁄₂₀₀ of an ounce of fine gold in the form of a card or note containing the gold. Twenty-five Quint represents ¹⁄₄₀ of an ounce of Fine Gold in the form of a card or note containing the gold. In further embodiments, the piece may comprise a rectangle or a bar, and the outer form may comprise an ingot or a card. The bar may comprise a stamped and/or rolled, credit-card-sized precious metal bar, divisible into Quint units of equal size and weight, composed of 99.99% pure gold and weighing one troy ounce, or divisible into fifty QuintS units of equal size and weight, composed of 99.9% pure silver and weighing one-half of a troy ounce, produced pursuant to the Quintric standard of weights and measures, which may or may not be recognized by any country or other jurisdiction as legal tender. A Quint/QuintS dispenser device may also be provided.

A Quintric™ (or optionally Quintessimal or Quintesimal) Specie Standard may combine conventional precious metal bullion embodiments with a treatment of smaller denominations to achieve a decimalized accounting unit, the "Quint™", for use in connection with physical and electronic specie transactions. The vast majority of all existing precious metal bullion is measured in the troy ounce. The Quintric™ standard draws its name from a combination of base 5 and base 100 numerical systems.

To establish a centesimal standard built on the longstanding troy system of precious metal weights and measures, that unit may be denominated as one "quint", which may be defined as one of a set of five. One Quint Gold (Quint™) is defined as 5 U.S. gold cents or 1,000th of a troy ounce of gold. One Quint Silver (QuintS™) is defined as five U.S. silver cents or one 20th of a troy ounce of silver. Note that the plural and singular form of Quint™ (gold) and QuintS™ (silver) is the same. A SentiQuint™ or Squint™ would be 100,000th of one troy ounce of gold. A SentiQuintS™ or SquintS™ would be 2,000th of one troy ounce of silver. Again, the singular and plural form or each word is the same. The quintal theme may be carried, not only by virtue of five cents to a quint, but also five pennyweight (DWT) to a quarter troy ounce, which, in at least one possible embodiment, would be the smallest of the three-piece traditional coin alloy series illustrated in the table below.

| Alloy Name | Gold | Silver | Cooper or Other |
| --- | --- | --- | --- |
| Coin Gold | 91.67% | 3.00% | 5.33% |
| Coin Silver | 90.00% | 0.00% | 10.00% |
| Quint Gold | 50.00% | 0.00% | 50.00% |
| Quint Silver | 0.00% | 50.00% | 50.00% |

| Alloy Name | Gold | Silver | Cooper or Other |
|---|---|---|---|
| Squint Gold | 75.00% | 25.00% | 0.00% |
| Squint Silver | 00.00% | 25.00% | 75.00% |
| Four-9s Gold | 99.99% | 0.01% | 0.00% |
| Three-9s Silver | 0.00% | 99.90% | 0.10% |

The foregoing table describes various possible precious metal alloys which could be used in minting potential physical embodiments of specie compliant with this standard. The following tables lay out a couple of possible embodiment schemes for gold and silver, respectively.

| Gold Rounds | | | | |
|---|---|---|---|---|
| Alloy | Diameter | Net Ounce | Net DWT | Net Quint |
| Coin Gold | 30.00 mm | 1.00 | 20.00 | 1,000 |
| Coin Gold | 27.00 mm | 0.50 | 10.00 | 500 |
| Coin Gold | 25.00 mm | 0.25 | 5.00 | 250 |
| Quint Gold | 20.00 mm | 0.10 | 2.00 | 100 |
| Quint Gold | 18.00 mm | 0.05 | 1.00 | 50 |
| Squint Gold | 16.00 mm | 0.01 | 0.20 | 10 |

| Silver Rounds | | | | |
|---|---|---|---|---|
| Alloy | Diameter | Net Ounce | Net DWT | Net QuintS |
| Coin Silver | 39.00 mm | 1.00 | 20.00 | 20.00 |
| Coin Silver | 34.00 mm | 0.50 | 10.00 | 10.00 |
| Coin Silver | 30.00 mm | 0.25 | 5.00 | 5.00 |
| Quint Silver | 27.00 mm | 0.10 | 2.00 | 2.00 |
| Quint Silver | 25.00 mm | 0.05 | 1.00 | 1.00 |
| Squint Silver | 20.00 mm | 0.01 | 0.20 | 0.20 |

Physical Rounds

It is also envisioned that specie produced according to the foregoing specifications may incorporate anti-counterfeiting measures on the obverse and reverse of each piece, show on the reverse of each piece the quint count in a large numeric format, display the pennyweight and/or troy ounce precious metal content on the reverse, and the like.

Quint Cards or Notes

Another possible embodiment would be a "Quint Card" which may encase a pure metal bar, wire, strip or round (FIG. 9). This physical embodiment may include tamper-proof encasing of either three-9s silver or four-9s gold round or rectangle, encasement fabricated with standard credit card or monetary note length, width and thickness, Quint count on obverse of precious metal piece along with a stylized "Q", anti-counterfeiting engravings or hologram on the reverse of the piece, optional advertising logo and copy on the front side of the Quint card, certificate of authenticity on the back side of the card that may include ounce, pennyweight, and quint weights, unique serial number and barcode, magnetic data strip, QR code, and so forth.

To facilitate electronic specie transactions, an additional denomination which may equal 1/100th of a Quint and 1/10,000th of a troy ounce may be the "Sentiquint" or "Squint" for short. Amounts expressed in Squints may potentially represent in a paper or electronic medium an unallocated percentage interest in a larger specie bar or round held in a commercial bullion storage facility.

The depositor may withdraw physical CLTC, or commodities produced in conformity with the Quintric™ Specie Standard, from the FID's custody in accordance with the terms of the applicable deposit agreement. Alternatively, the depositor may instruct the FID to retire, or the depositor's assignee to assume and then retire through the FID, a liability of the depositor by authorizing the tender into escrow of sufficient CLTC, heretofore held for the benefit of the depositor, to make payment for the debt, public charge, tax or due in question. The FID may effect whatever Currency translations or conversions may be required to tender payment in whatever Currency the recipient may desire.

Account balances, currency translations, payment instructions and transaction details may be communicated, recorded and maintained through a variety of mechanisms, media and machines designed to process written and digitally transmitted data through a plurality of mainframe, desktop, laptop, tablet and handheld computing and telecommunications devices running specialized software applications designed, or suited for, use with the present invention.

In order to minimize or eliminate arbitrage risk, the FID carrying out Currency conversions may aggregate all CLTC transactions subject to the then current exchange rate and execute a single commodity or currency acquisition or disposition as a hedge against future exchange rate fluctuations in a CLTC largely or wholly composed of the commodity or currency in question. The FID may subsequently execute simultaneous commodity liquidation and CLTC acquisition transactions having sufficient critical mass to achieve optimal or otherwise desirable cost efficiencies. CLTC conversions may be performed for the benefit of depositors from the FID's CLTC reserve account(s). Hedging transactions may be carried out to replenish reserve accounts, not depositor holdings.

In one embodiment, an apparatus may process the conversion of Paper legal tender to Specie legal tender for the benefit of account holders through one or more discrete, uniform transactions at regularly updated exchange rates over a specified period of time, the apparatus being comprised of one or more digital processors configured to implement operations by means of the following plurality of modules: (a) a Paper legal tender trust account module to account for the receipt and disbursement of Paper legal tender; (b) an exchange rate module to record at regular intervals with respect to each type of Specie legal tender the amount of Paper legal tender having equal purchasing power according to established market indices; (c) an arbitrage hedge account module to calculate and execute a bullion acquisition or liquidation transaction in an amount equal to the net Paper/Specie legal tender exchange conducted at the time of each exchange rate setting; (d) a bullion exchange module to facilitate the periodic, contemporaneous exchange of fractional bullion bar holdings for whole Specie legal tender coins; (e) a Specie legal tender holdings module for tracking account holders and participating FIDs respective fractional interests in vaulted Specie legal tender coin held within the system; and (f) a Specie legal tender disbursement module to monitor the physical delivery, upon request, of whole Specie legal tender coinage to account holders.

In another embodiment, an apparatus may process and account for financial transactions between an account holder within the system and another party who may or may not be an account holder within the system, the apparatus being comprised of one or more digital processors configured to implement operations by means of the following plurality of modules: (a) a Specie legal tender transaction entry module by which an account holder may, by means of a plurality of instruments or devices, enter transaction details relative to the acquisition of goods or other property from, the rendition of services by, or payment of taxes or other public charges to, another party who may or may not be an account holder within the system; (b) a Specie legal tender transaction verification module whereby the sufficiency of account holder balances and regulatory compliance may be verified prior to execution of the transaction; (c) a tax accounting module whereby transaction details and funds sufficient for tax remittances may be gathered and sequestered for that purpose; (d) a form of tender determination module by which the intended payment recipient's preferred form of legal tender, whether Paper or some form of Specie may be determined; and (e) a Specie legal tender transaction execution module that may execute and create a record of each transaction between an account holder and another party who may or may not be an account holder, in which Specie legal tender is used, in whole or in part, as a medium of exchange on one or on both sides of the transaction.

A further embodiment may provide for the clearing and settlement of transactions denominated in whole or in part in Specie legal tender in which multiple FIDs participate in the execution and recordation of the transaction, being comprised of one or more digital processors configured to implement operations by means of the following plurality of modules: (a) a transactor verification module by which the identity of the parties to the transaction may be verified as persons authorized to transact within the system; (b) an account verification module whereby the existence of the accounts involved in the transaction may be verified; (c) an available balance verification module whereby available balance(s) of the account holder tendering payment may be verified; and (d) an account reconciliation module whereby the account of the payer may be debited and the account of the recipient may be credited.

Figure 10:
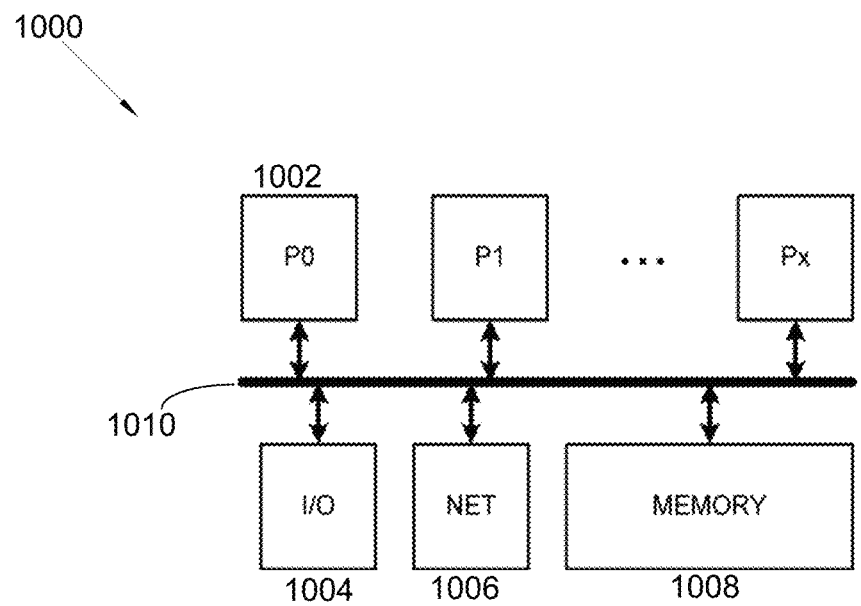
FIG. 10 illustrates a possible computer hardware platform, in accordance with the present invention.

FIG. 10 illustrates a possible computer hardware platform 100 upon which the present invention may be at least in part deployed. The hardware platform may include processor(s) 1002, memory 1008, a network interface 1006, and an I/O (Input/Output) device interface 1004, connected through a bus 1010.

The hardware platform may be of any form factor or type, including an embedded system, a handheld, a notebook, a personal computer, a minicomputer, a server, a mainframe, a supercomputer, and the like.

The processor(s) may be present in any quantity, including a uniprocessor, and may have any instruction set architecture. In an embodiment, the processor(s) may have one or more levels of dedicated or shared caches. Possible physical implementations may include multi-chip, single chip, multi-core, hyperthreaded processors, and the like.

The memory may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface may support any network protocol or architecture. It may support both wireless and hard-wired network connections. It may comprise Ethernet, Token Ring, System Network Architecture ("SNA"), and the like. In one embodiment, it may be integrated with the I/O device interface.

The I/O device interface may be driven primarily by the processor(s) or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus may comprise a high-speed internal network.

Figure 11:
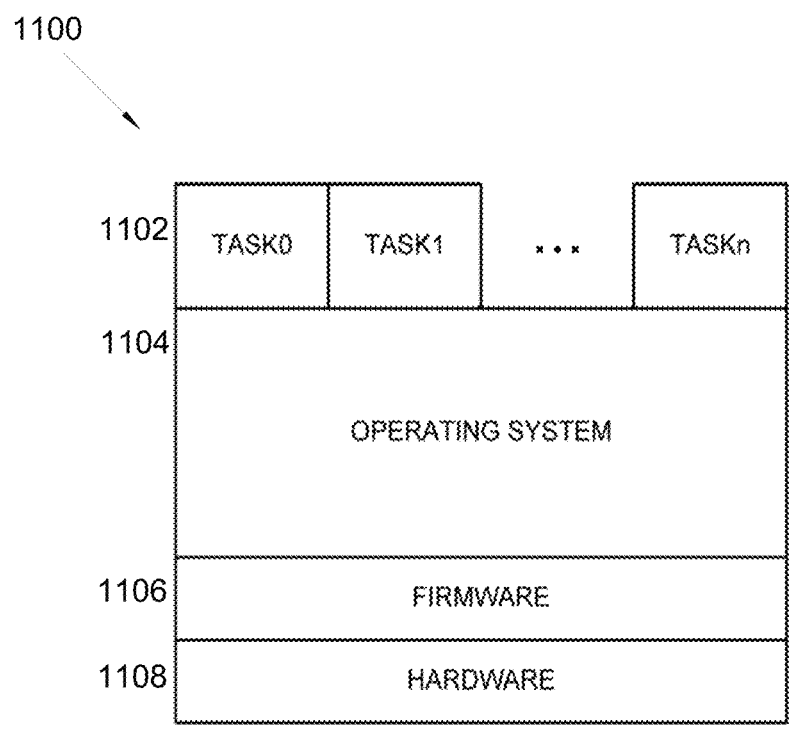
FIG. 11 is a diagram of a possible computer including a software stack in which the present invention may at least in part reside, in accordance with the present invention.

FIG. 11 is a diagram of a possible computer 1100 including a software stack in which the present invention may at least in part reside. The software stack may include task(s) 1102, hosted on an operating system 1104, enabled by firmware 1106, running on a hardware platform 1108 of which the configuration of FIG. 10 is representative.

The task(s) 1102 may include both user-level and system-level tasks. They may be interactive or batch. They may run in the foreground or background. User-level task(s) may include applications, programs, jobs, middleware, and the like. System-level task(s) may include services, drivers, daemons, utilities, and the like.

The operating system 1104 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system may be single-user or multi-user. It may be single-tasking or multi-tasking. In an embodiment, the operating system may be real-time. In another embodiment, the operating system may be embedded.

The firmware 1106 may comprise microcode, which may reside in a microstore of the processor(s). In an embodiment, the firmware may comprise low-level software, which may reside in memory. In one embodiment, the firmware may comprise a rudimentary operating system. In a further embodiment, the firmware may support virtualization so as to permit the concurrent operation of multiple operating systems on a hardware platform.

These features and advantages of the present invention will become more fully apparent from the following description and appended claims, or may be learned by the practice of the invention as set forth hereinafter.

In order that the advantages of the invention will be readily understood, a description of the invention will be rendered by reference to specific embodiments that are illustrated in the appended drawings. These drawings depict only typical embodiments of the invention and are not therefore to be considered to be limiting of its scope.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. A module may comprise utilitarian objects of any kind, including mechanical structures or devices, electrical devices, electromechanical devices, optical devices, analog electronics, digital electronics, and so forth. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Figure 13A:
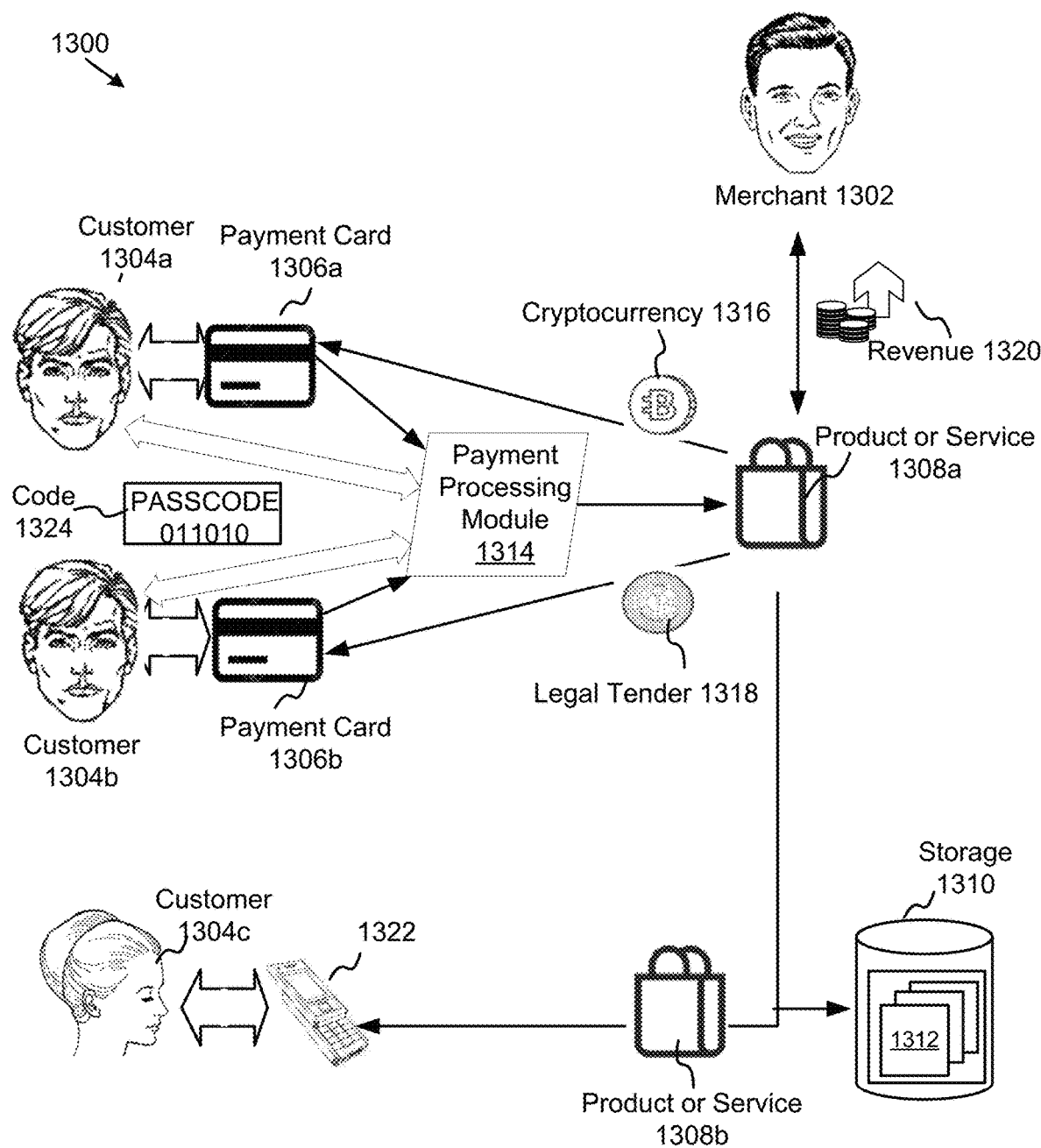
FIG. 13A is an entity-relationship diagram illustrating another embodiment of a system for performing transactions through a payment processing module.

FIG. 13A illustrates an entity-relationship diagram illustrating another embodiment of a system 1300 for performing transactions through a payment processing module 1314 with exchangeable cryptocurrency 1316 and legal tender 1318, in accordance with the present invention.

Payment processing module 1314 allows a customer 1304a and a merchant 1302 to transact for products and services 1308 through legal tender 1318 and cryptocurrency 1316; and then generate revenue 1320 for the merchant 1302 through affiliate profits, trading the currencies for profit, and lower transaction fees. Customer 1304c may upload payment for the products or services 1308b via a computer or mobile communication device 1322 into a storage device 1310 having computer readable storage 1312.

Customer 1304a, 1304b registers a payment card 1306a, 1306b through payment processing module 1314. The payment card identifier is from a payment card, such as a card number, a card expiration date, and a card code.

Customer 1304b provides merchant 1302 with a revenue 1320, such as a commission when customer registers. The registration may include providing a name, contact information, and other personal information.

Customer 1304c transmits a customer unique identifier to payment processing module 1314 through a mobile communication device 1322. The customer unique identifier may include an email address. The mobile communication device 1322 may include a smart phone, a tablet, and a laptop.

Payment processing module 1314 transmits a passcode 1324 and instructions to the customer 1304a, 1304b. Customer 1304a, 1304b receives a text message with the passcode 1324. This is a verification and authorization for the customer to access the legal tender 1318 or cryptocurrency 1316.

Customer 1304a, 1304b transmits the passcode 1324, the payment card identifier, and a mobile device identifier to payment processing module 1314.

Customer 1304a, 1304b receives access to legal tender 1318 or cryptocurrency 1316 that is at least equal to the price of the product or service 1308a to the payment processing module 1314. More legal tender 1318 or cryptocurrency 1316 can be requested for cash back.

As discussed above, payment processing module 1314 is operable with a banking module, a vaulting module, a legal tender fund module that has accounting information for complementary legal tender, a cache fund module, a cryptocurrency module that has accounting information for virtual monetary tokens, a crypto-shares module that has accounting information for virtual share tokens, an escrow fund module, a trust fund module, a payment processing module, banking module, and vaulting module. The modules store, exchange, and maintain accounts for cryptocurrency and legal tender through payment processing module 1314.

Figure 13B:
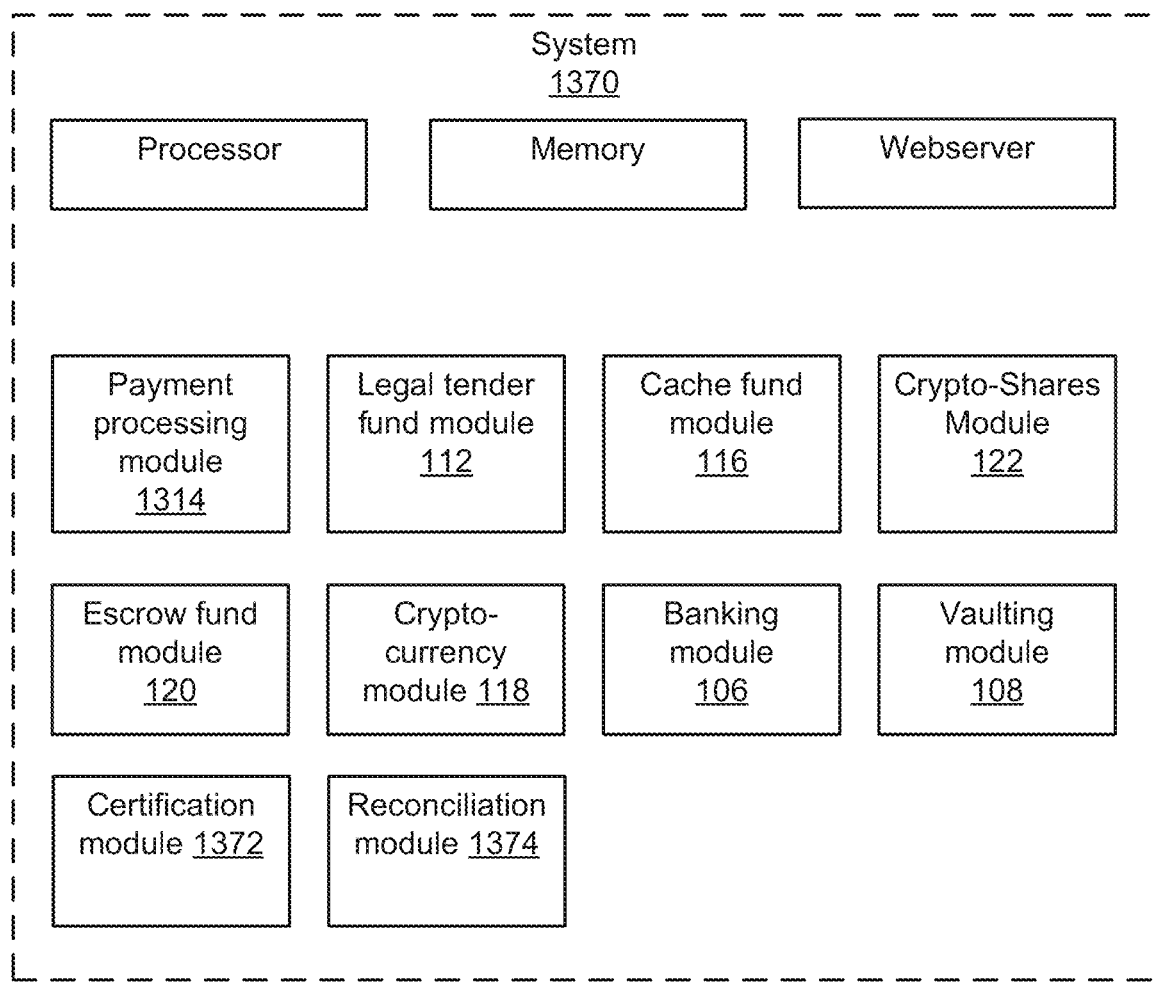
FIG. 13B is a block diagram of a system for performing transactions with exchangeable cryptocurrency in accordance with the present invention.

FIG. 13B is a block diagram of a system 1370 for performing transactions with exchangeable cryptocurrency in accordance with the present invention.

Many of the modules are further described above in relation to FIGS. 1-13A.

The system 1370 may comprise, in addition or in place of other modules, a reconciliation module 1374 configured to reconcile a distributed blockchain using video media of physical tender being counted and stored, the video media recorded in computer-readable memory, wherein the reconciliation module is operable in response to activation of the reconciliation module by an account holder. The video media may comprise, by way of example, .mp4 video footage of vault holdings in gold or silver being counted, authenticated, placed in a tray and shelved.

The system 1370 may also comprise a certification module 1372 configured to embed in a tangible medium and/or computer-readable memory a denominated value using a unique identifier adapted to allow the tangible medium to certify a bearer (or account a holder) seeking to redeem a portion (or all) of the denominated value in vaulted physical legal tender.

Figure 14:
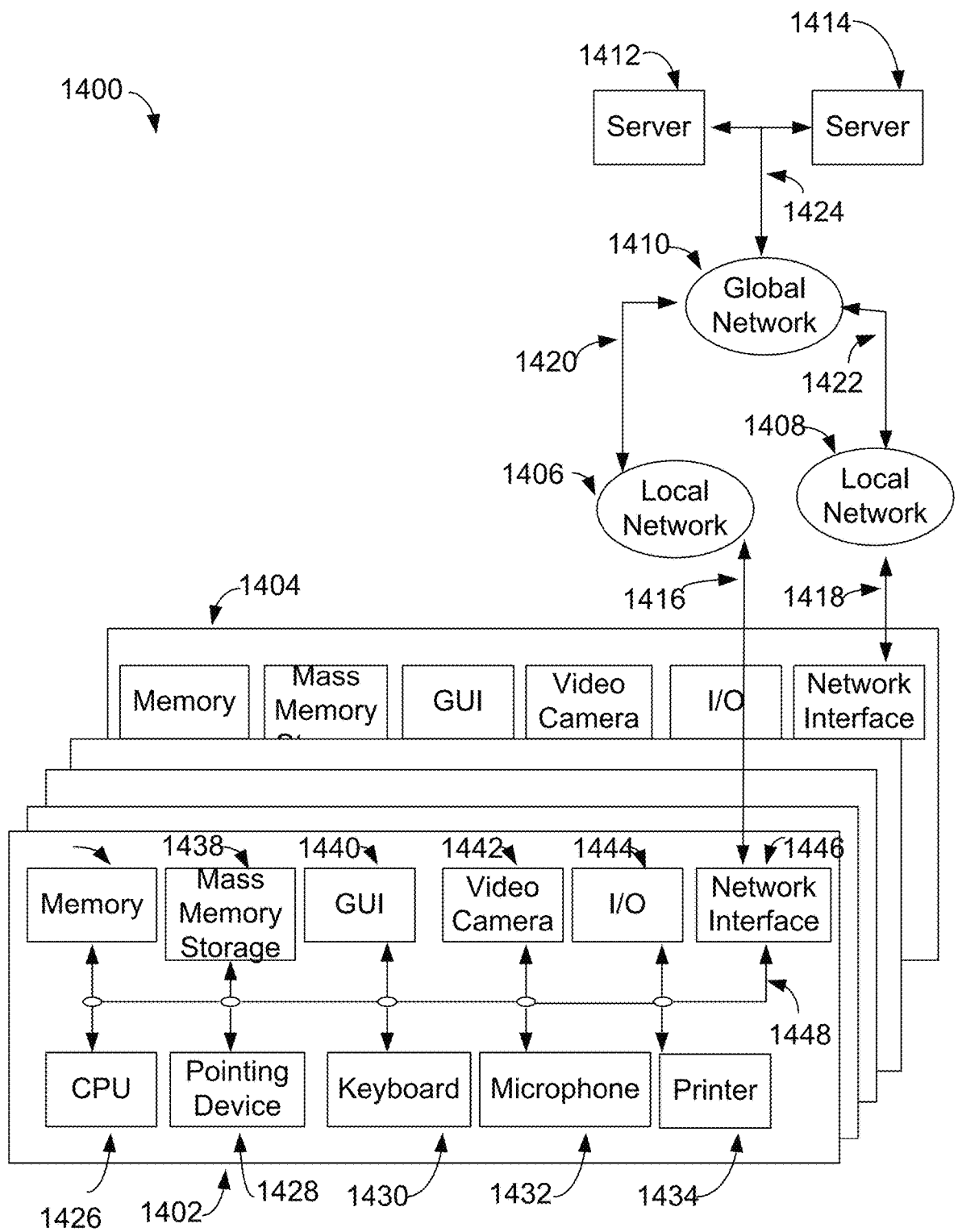
FIG. 14 is a block diagram depicting an exemplary client/server system which may be used by an exemplary web-enabled/networked embodiment of the present invention.

FIG. 14 is a block diagram depicting an exemplary client/server system which may be used by an exemplary web-enabled/networked embodiment of the present invention. In the present invention, a communication system 1400 includes a multiplicity of clients with a sampling of clients denoted as a client 1402 and a client 1404, a multiplicity of local networks with a sampling of networks denoted as a local network 1406 and a local network 1408, a global network 1410 and a multiplicity of servers with a sampling of servers denoted as a server 1412 and a server 1414.

Client 1402 may communicate bi-directionally with local network 1406 via a communication channel 1416. Client 1404 may communicate bi-directionally with local network 1408 via a communication channel 1418. Local network 1406 may communicate bi-directionally with global network 1410 via a communication channel 1420. Local network 1408 may communicate bi-directionally with global network 1410 via a communication channel 1422. Global network 1410 may communicate bi-directionally with server 1412 and server 1414 via a communication channel 1424. Server 1412 and server 1414 may communicate bi-directionally with each other via communication channel 1424. Furthermore, clients 1402, 1404, local networks 1406, 1408, global network 1410 and servers 1412, 1414 may each communicate bi-directionally with each other.

In one embodiment, global network 1410 may operate as the Internet. It will be understood by those skilled in the art that communication system 1400 may take many different forms. Non-limiting examples of forms for communication system 1400 include local area networks (LANs), wide area networks (WANs), wired telephone networks, wireless networks, or any other network supporting data communication between respective entities.

Clients 1402 and 1404 may take many different forms. Non-limiting examples of clients 1402 and 1404 include personal computers, personal digital assistants (PDAs), cellular phones and smartphones.

Client 1402 includes a CPU 1426, a pointing device 1428, a keyboard 1430, a microphone 1432, a printer 1434, a memory 1436, a mass memory storage 1438, a GUI 1440, a video camera 1442, an input/output interface 1444 and a network interface 1446.

CPU 1426, pointing device 1428, keyboard 1430, microphone 1432, printer 1434, memory 1436, mass memory storage 1438, GUI 1440, video camera 1442, input/output interface 1444 and network interface 1446 may communicate in a unidirectional manner or a bi-directional manner with each other via a communication channel 1448. Communication channel 1448 may be configured as a single communication channel or a multiplicity of communication channels.

CPU 1426 may be comprised of a single processor or multiple processors. CPU 1426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1436 is used typically to transfer data and instructions to CPU 1426 in a bi-directional manner. Memory 1436, as discussed previously, may include any suitable computer-readable media, intended for data storage, such as those described above excluding any wired or wireless transmissions unless specifically noted. Mass memory storage 1438 may also be coupled bi-directionally to CPU 1426 and provides additional data storage capacity and may include any of the computer-readable media described above. Mass memory storage 1438 may be used to store programs, data and the like and is typically a secondary storage medium such as a hard disk. It will be appreciated that the information retained within mass memory storage 1438, may, in appropriate cases, be incorporated in standard fashion as part of memory 1436 as virtual memory.

CPU 1426 may be coupled to GUI 1440. GUI 1440 enables a user to view the operation of computer operating system and software. CPU 1426 may be coupled to pointing device 1428. Non-limiting examples of pointing device 1428 include computer mouse, trackball and touchpad. Pointing device 1428 enables a user with the capability to maneuver a computer cursor about the viewing area of GUI 1440 and select areas or features in the viewing area of GUI 1440. CPU 1426 may be coupled to keyboard 1430. Keyboard 1430 enables a user with the capability to input alphanumeric textual information to CPU 1426. CPU 1426 may be coupled to microphone 1432. Microphone 1432 enables audio produced by a user to be recorded, processed and communicated by CPU 1426. CPU 1426 may be connected to printer 1434. Printer 1434 enables a user with the capability to print information to a sheet of paper. CPU 1426 may be connected to video camera 1442. Video camera 1442 enables video produced or captured by user to be recorded, processed and communicated by CPU 1426.

CPU 1426 may also be coupled to input/output interface 1444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1426 optionally may be coupled to network interface 1446 which enables communication with an external device such as a database or a computer or telecommunications or internet network using an external connection shown generally as communication channel 1416, which may be implemented as a hardwired or wireless communications link using suitable conventional technologies. With such a connection, CPU 1426 might receive information from the network, or might output information to a network in the course of performing the method steps described in the teachings of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
 a processor; and
 a computer-readable memory storing instructions, that when executed by the processor, causes the system to perform the following steps or operations:
  maintaining accounting information for a complementary legal tender currency, wherein the complementary legal tender currency is physically stored in one or more secure facilities;
  maintaining accounting information for a physical cached complementary currency, wherein the physical cached complementary currency is physically stored in the one or more secure facilities;

transmitting a digital passcode to a customer via SMS text message authorizing said customer to access the complementary legal tender currency;

reconciling a distributed blockchain using .mp4 video media footage of gold or silver being counted and stored, which gold and silver is exclusively associated with the complementary legal tender currency;

embedding in a tangible physical medium a denominated value in the form of a unique identifier of the complementary legal tender currency depicted in the .mp4 video;

maintaining accounting information for a virtual monetary token that corresponds to the complementary legal tender currency, wherein the virtual monetary token is payable upon demand for the complementary legal tender currency of corresponding value; and maintaining accounting information for a virtual share token that corresponds to the physical cached complementary currency;

wherein multiple virtual share tokens represent ownership of a percentage of the physical cached complementary currency;

wherein the percentage is that of the number of the virtual share tokens owned as a percentage of total virtual share tokens outstanding;

wherein the virtual monetary tokens and the virtual share tokens are configured to be exchanged.

2. The system of claim 1, wherein the steps or operations further comprise maintaining accounting information for a predominant legal tender currency, wherein the predominant legal tender currency is exchanged for the complementary legal tender currency and the cached complementary currency.

3. The system of claim 2, wherein a portion of the value from a transaction is placed in the cache fund module and a corresponding virtual share token is issued to a recipient of the virtual monetary token under the transaction.

4. The system of claim 3, wherein the steps or operations further comprise maintaining accounting information for investment assets including the predominant legal tender currency, wherein the investment assets are exchanged for the complementary legal tender currency and the cached complementary currency.

5. The system of claim 2, wherein the steps or operations further comprise maintaining accounting information for the predominant legal tender currency, wherein the predominant legal tender currency is held in accounts with one or more financial institutions.

6. The system of claim 5, wherein the steps or operations further comprise maintaining accounting information for the complementary legal tender currency and the cached complementary currency, wherein the complementary legal tender currency and the cached complementary currency is physically stored in the one or more secure facilities.

7. The system of claim 1, wherein the accounting information is maintained in a distributed ledger.

8. The system of claim 7, wherein the distributed ledger comprises a blockchain.

9. The system of claim 1, wherein the complementary legal tender currency comprises precious metal coinage that is recognized as legal tender in a governmental jurisdiction.

10. The system of claim 9, wherein the value of the virtual monetary token is based on a price of the complementary legal tender currency as denominated in the predominant legal tender currency and published by the governmental jurisdiction.

11. The system of claim 1, further comprising a complementary legal tender currency subsystem, the subsystem containing the modules.

\* \* \* \* \*